J. RADDIN.
Carriage Wheel Hub.
No. 102,709.
Patented May 3, 1870.
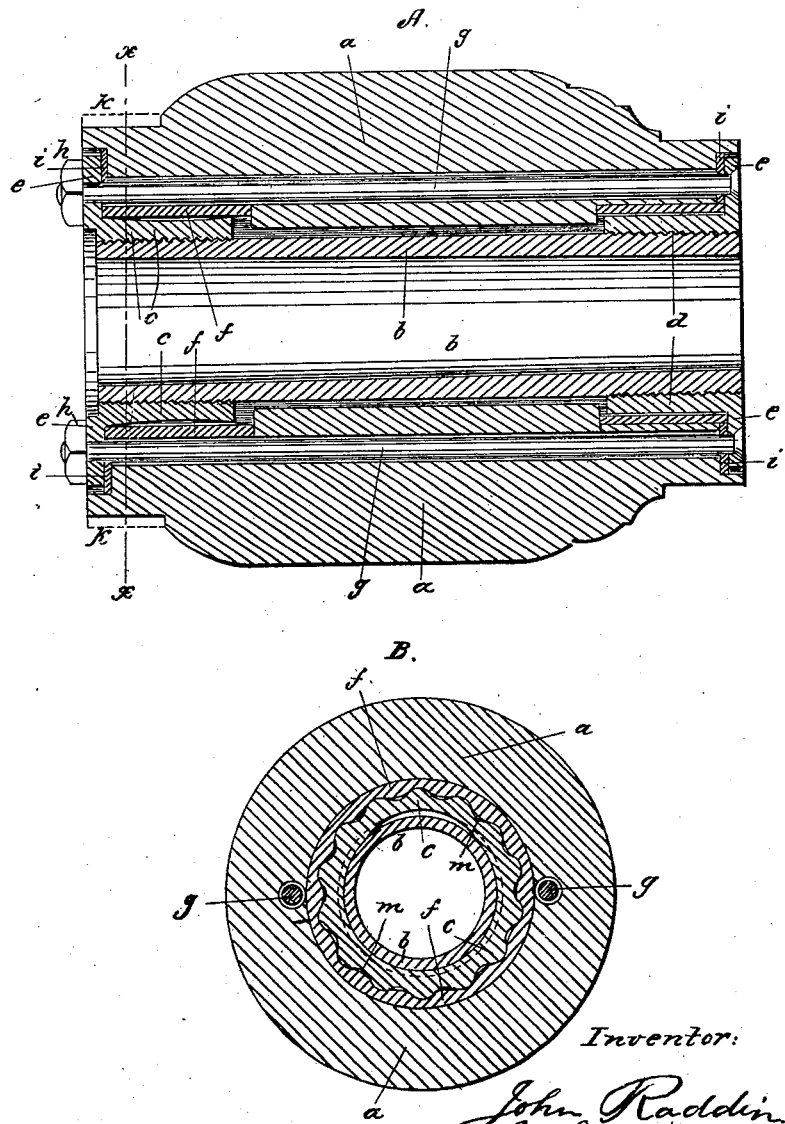

United States Patent Office.

JOHN RADDIN, OF LYNN, MASSACHUSETTS.

Letters Patent No. 102,709, dated May 3, 1870.

---

IMPROVED HUB OF ROAD-CARRIAGES.

---

The Schedule referred to in these Letters Patent and making part of the same

---

*To all whom it may concern:*

Be it known that I, JOHN RADDIN, of Lynn, in the county of Essex and State of Massachusetts, have invented an Improvement in the Hubs of Road-Carriage Wheels; and I do hereby declare that the following, taken in connection with the drawings which accompany and form part of this specification, is a description of my invention sufficient to enable those skilled in the art to practice it.

United States Letters Patent, No. 64,796, were granted to me, May 14, 1867, for an improvement in car and carriage-wheels, which improvement consisted in placing around the hub of a wheel a ring of rubber protected by and inclosed between flanges at the opposite ends of the hub, the rubber not filling the space in the hub between the flanges, but the parts being so constructed and arranged that provisions made for compression and expansion of the rubber in an inclosed chamber so that it cannot protrude from the hub.

My present invention relates particularly to the application of such patented improvement to wooden hubs of common road-carriage wheels, the invention primarily consisting in combining with the iron box of such a hub, flanged collars, within the inner surface of the flange and around the body of each of which a chamber is formed, in which is inclosed a ring or tube of rubber, or other similar elastic material, the flanges of the opposite collars being bolted together by bolts extending lengthwise through the body of the hub.

The drawing shows, in section, a common wooden carriage hub, *a*, lined with a metal box or bushing, *b*, which extends through the hub from end to end thereof and forms the bearing for the axle.

Upon the opposite ends of this metal box are screwed or driven two ferrules or collars, *c d*, each having a flange, *e*, setting in a shallow recess in the adjacent end of the hub, as seen in the drawing, each end of the hub being counterbored, larger than the hole bored through for the box *b*, to receive the body of the collar and to leave an annular space or chamber around the collar, in which space I insert the rubber or elastic ring or packing *f*, which is thus interposed between the collar and the hub, all around the outer cylindric surface of the body of the collar.

The outer end of the rubber is covered and protected by the flange of the adjacent collar, and each counterbore is of such size, relatively to the space occupied by the collar and the rubber, that there is always a free space to permit free expansion of the rubber, or its expansion in one direction as it is compressed in another direction.

The opposite flanges *e* are confined in position by bolts *g* and nuts *h*, the bolts preventing relative movement of the flanges as well as outward movement thereof, each bolt passing through the hub, as seen in the drawing, the holes bored for their reception being larger in diameter than the bolts, to permit slight relative radial movements of the bolts or hub.

Between the collars *c d*, the central hole through the hub is larger, in diameter, than the box *b*, to permit relative movements of the hub and box, and so of the shallow flange-receiving recesses, which are larger in diameter than the flanges, the box, collars, and bolts, which are screwed together, moving as one piece, radially, with respect to the wooden body of the hub, being kept normally in central position by the rubber rings or elastic packing tubes *f*, upon which, however, the collars are so cushioned that the rubber yields, and allows the collars to yield under the weight upon the carriage-axle.

To permit this yielding movement to take place with freedom, I interpose betweem each flange and the adjacent end of the hub a flexible washer, *i*, preferably made of rubber, and, by drawing the flanges up tightly against these washers, the rubber is preserved from entrance of oil and dust, especially the former, it being being very important, and, I consider, essential for the preservation of the resilient properties of the rubber, that it shall be kept from contact with the oil used to lubricate the axle.

I prefer to screw each collar upon the box as shown, but they may be driven tightly on without the screw-threads, or each flange may extend over the whole end of the hub and around the cylindric surface thereof, as seen by the dotted lines at *k*; and under the cylindric flanges, thus extending around the hub or between such flanges and the hub, an additional rubber or similar elastic ring may be interposed, thus giving the box a durable bearing upon the rubber around the collars and upon the rubber around the hub under each flange *k*.

This invention may be readily applied to the hubs and boxes of carriage-wheels already made and used, by boring out the ends of the hub to receive the collars and their flanges, and fitting the collars upon the ends of the metal box.

Around each collar, between it and the rubber, a ring or tube of thin sheet metal, *l*, may be interposed, to prevent adhesion of the rubber to the collar, or buckling of the rubber when the collar is applied or removed.

To keep the rubber packing in place or from slipping, the outer surface of each collar may be corrugated or recessed, as seen at *m*, or the inner hub-surface around the packing-tubes may be so corrugated or recessed.

The adjacent surfaces of the box *b* and hub may be interlocked by a projecting rib upon one entering a groove in the other, as in ordinary carriage-hubs.

I do not claim the grooves or cavities in the peripheries of the collars on the metal box or bushing in the hub.

I claim, in combination with the hub-body *a*, and its metal bushing *b*, the flanged collars *c d*, surrounded by rubber or other elastic rings or tubes *f*, when the flange of each collar covers the end of the adjacent ring or tube *f*, and the flanges of the opposite collars are connected by bolts, *g*, running through the body *a*, all substantially as described.

JOHN RADDIN.

Witnesses:
J. B. CROSBY,
FRANCIS GOULD.